(12) United States Patent
Qiu (10) Patent No.: US 10,776,348 B2
(45) Date of Patent: Sep. 15, 2020

(54) BLOCKCHAIN-BASED SMART CONTRACT INVOCATION METHOD AND APPARATUS, AND ELECTRONIC DEVICE

(71) Applicant: Alibaba Group Holding Limited, George Town (KY)

(72) Inventor: Honglin Qiu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/453,866

(22) Filed: Jun. 26, 2019

(65) Prior Publication Data
US 2020/0004737 A1 Jan. 2, 2020

(30) Foreign Application Priority Data
Jun. 27, 2018 (CN) .......................... 2018 1 0681249

(51) Int. Cl.
*G06F 16/23* (2019.01)
*G06F 16/245* (2019.01)
*G06F 16/27* (2019.01)

(52) U.S. Cl.
CPC ........ *G06F 16/2379* (2019.01); *G06F 16/245* (2019.01); *G06F 16/27* (2019.01)

(58) Field of Classification Search
None
See application file for complete search history.

(56) References Cited

U.S. PATENT DOCUMENTS 10,108,954 B2  10/2018  Dunlevy et al.
10,135,607 B1  11/2018  Roets
(Continued)

FOREIGN PATENT DOCUMENTS

| CN | 101937224 | 1/2011 |
| CN | 106598549 | 4/2017 |

(Continued)

OTHER PUBLICATIONS

Ahmad et al., "Integration of IoT Devices Via a Blockchain-based Decentralized Application," Jan. 2017, retrieved on Sep. 13, 2019, retrieved from URL<https://elib.uni-stuttgart.de/bitstream/11682/9483/1/MA%20-%20Afzaal%20Ahmad.pdf>, 105 pages.

(Continued)

*Primary Examiner* — Umut Onat
(74) *Attorney, Agent, or Firm* — Fish & Richardson P.C.

(57) ABSTRACT

Techniques for invocating a smart contract are described. One example method includes receiving a target transaction that is used to initiate an invocation of a smart contract, wherein the target transaction comprises invocation data, and wherein the invocation data comprises a data digest associated with target data stored in a third-party storage system interconnected with a blockchain; querying the target data from the third-party storage system; receiving a query result returned by the third-party storage system, wherein the query result comprises the target data; performing a content verification on the target data; determining that the content verification on the target data succeeds; invoking the smart contract to perform a smart contract computation on the invocation data included in the target transaction; and storing a computation result from the smart contract computation in a distributed database associated with the blockchain after the smart contract computation is completed.

17 Claims, 4 Drawing Sheets

(56) References Cited

U.S. PATENT DOCUMENTS

| | | | |
|---|---|---|---|
| 10,380,359 | B2 | 8/2019 | Naqvi et al. |
| 2012/0117363 | A1 | 5/2012 | Cummings et al. |
| 2015/0379510 | A1 | 12/2015 | Smith |
| 2017/0155515 | A1 | 6/2017 | Androulaki et al. |
| 2017/0236123 | A1* | 8/2017 | Ali .................... G06Q 20/3827 705/75 |
| 2017/0289111 | A1 | 10/2017 | Voell et al. |
| 2018/0005186 | A1 | 1/2018 | Hunn |
| 2018/0025181 | A1 | 1/2018 | Barinov et al. |
| 2018/0123779 | A1 | 5/2018 | Zhang |
| 2018/0174157 | A1* | 6/2018 | Endress .................... G09C 1/00 |
| 2018/0174158 | A1* | 6/2018 | Endress ................ H04L 9/3247 |
| 2018/0287797 | A1* | 10/2018 | Banerjee ................... H04L 9/32 |
| 2019/0108140 | A1* | 4/2019 | Deshpande ......... G06F 12/1408 |
| 2019/0164153 | A1 | 5/2019 | Agrawal et al. |
| 2019/0205884 | A1 | 7/2019 | Batra et al. |
| 2019/0251648 | A1* | 8/2019 | Liu .................... H04N 21/2541 |
| 2019/0266145 | A1 | 8/2019 | Qiu et al. |
| 2019/0278767 | A1 | 9/2019 | Cao et al. |
| 2019/0287107 | A1 | 9/2019 | Gaur et al. |
| 2019/0394267 | A1* | 12/2019 | Bistram ................ H04L 67/108 |
| 2020/0004788 | A1 | 1/2020 | Qiu |

FOREIGN PATENT DOCUMENTS

| | | |
|---|---|---|
| CN | 107193490 | 9/2017 |
| CN | 107274186 | 10/2017 |
| CN | 107306183 | 10/2017 |
| CN | 107392610 | 11/2017 |
| CN | 107425982 | 12/2017 |
| CN | 107464118 | 12/2017 |
| CN | 107688927 | 2/2018 |
| CN | 107819582 | 3/2018 |
| CN | 108063752 | 5/2018 |
| CN | 108111312 | 6/2018 |
| CN | 108389129 | 8/2018 |
| TW | 200635317 | 10/2006 |
| WO | WO 2017098519 | 6/2017 |
| WO | WO 2018059939 | 4/2018 |
| WO | WO 2018084922 | 5/2018 |
| WO | WO 2019070938 | 4/2019 |

OTHER PUBLICATIONS

PCT International Search Report and Written Opinion in International Application No. PCT/US2019/039386, dated Sep. 13, 2019, 15 pages.

PCT International Search Report and Written Opinion in International Application No. PCTUS2019039405, dated Sep. 10, 2019, 14 pages.

Renner et al., "Endolith: A Blockchain-Based Framework to Enhance Data Retention in Cloud Storages," 26th Euromicro International Conference on Parallel, Distributed and Network-Based Processing, IEEE, Mar. 2018, pp. 627-634.

Robinson, "Requirements for Ethereum Private Sidechains," Cornell University Library, Jun. 26, 2018, 34 pages.

Sifah et al., "Chain-based Big Data Access Control Infrastructure," Journal of Supercomputing, Mar. 2019, 74 (10):4945-4964.

Zyskind et al., "Engima: Decentralized Computation Platform with Guaranteed Privacy," Jun. 2015, retrieved on Sep. 10, 2019, retrieved from URL<https://enigma.co/enigma_full_pdf>, 14 pages.

Christidis et al., "Blockchains and Smart Contracts for the Internet of Things," IEEE Access, 2016, 4:2292-2303.

Dinh et al., "Untangling Blockchain: A Data Processing View of Blockchain Systems," IEEE Transactions on Knowledge and Data Engineering, 2018, 30(7):1366-1385.

Luu et al., "Making Smart Contracts Smarter," CCS '16, 2016, pp. 254-259.

Yuan et al., "ShadowEth: Private Smart Contract on Public Blockchain," Journal of Computer Science and Technology, 2018, 33(3):542-556.

Zhang et al., "Town Crier: An Authenticated Data Feed for Smart Contracts," CSS 2016, 2016, pp. 270-282.

Crosby et al., "BlockChain Technology: Beyond Bitcoin," Sutardja Center for Entrepreneurship & Technology Technica Report, Oct. 16, 2015, 35 pages.

Nakamoto, "Bitcoin: A Peer-to-Peer Electronic Cash System," www.bitcoin.org, 2005, 9 pages.

\* cited by examiner

BLOCKCHAIN-BASED SMART CONTRACT INVOCATION METHOD AND APPARATUS, AND ELECTRONIC DEVICE

CROSS-REFERENCE TO RELATED APPLICATIONS

This application claims priority to Chinese Patent Application No. 201810681249.1, filed on Jun. 27, 2018, which is hereby incorporated by reference in its entirety.

TECHNICAL FIELD

One or more implementations of the present specification relate to the field of blockchain technologies, and in particular, to a blockchain-based smart contract invocation method and apparatus, and an electronic device.

BACKGROUND

A blockchain technology, also referred to as a distributed ledger technology, is an emerging technology in which several computing devices jointly participate in "accounting" to maintain a complete distributed database. The blockchain technology features decentralization and transparency, each computing device can record data in the database, and the data can be synchronized rapidly between the computing devices. Therefore, the blockchain technology has been widely applied to many fields.

SUMMARY

The present specification provides a blockchain-based smart contract invocation method, including: receiving a target transaction used to initiate invocation of a smart contract, where the target transaction includes invocation data, and at least a part of the invocation data includes a data digest of target data stored in a third-party storage system interconnected with a blockchain; querying the target data corresponding to the data digest from the third-party storage system, and performing content verification on the target data; and if the verification on the target data succeeds, invoking the smart contract to perform smart contract computation on the invocation data in the target transaction, and storing a computation result in a distributed database of the blockchain after the smart contract computation is completed.

Optionally, the third-party storage system stores a mapping relationship between the target data and the data digest of the target data; and the querying the target data corresponding to the data digest from the third-party storage system includes: initiating a query to the third-party storage system by using the data digest as a query index, to query the target data corresponding to the data digest.

Optionally, the performing content verification on the target data includes: computing a data digest of the target data based on a predetermined digest algorithm; determining whether the computed data digest is consistent with the data digest of the target data in the target transaction; and if the computed data digest is consistent with the data digest of the target data in the target transaction, determining that the verification on the target data succeeds.

Optionally, the third-party storage system includes a centralized content addressable storage CAS system or a distributed CAS system.

Optionally, the blockchain is any member blockchain in a consortium blockchain that includes several member blockchains.

Optionally, the third-party storage system is another member blockchain that has a cross-chain data reference relationship with the blockchain in the consortium blockchain.

The present specification further provides a blockchain-based smart contract invocation apparatus, including: a receiving module, configured to receive a target transaction used to initiate invocation of a smart contract, where the target transaction includes invocation data, and at least a part of the invocation data includes a data digest of target data stored in a third-party storage system interconnected with a blockchain; a query module, configured to query the target data corresponding to the data digest from the third-party storage system, and perform content verification on the target data; and an invocation module, configured to: if the verification on the target data succeeds, invoke the smart contract to perform smart contract computation on the invocation data in the target transaction, and store a computation result in a distributed database of the blockchain after the smart contract computation is completed.

Optionally, the third-party storage system stores a mapping relationship between the target data and the data digest of the target data; and the query module is configured to: initiate a query to the third-party storage system by using the data digest as a query index, to query the target data corresponding to the data digest.

Optionally, the query module is further configured to: compute a data digest of the target data based on a predetermined digest algorithm; determine whether the computed data digest is consistent with the data digest of the target data in the target transaction; and if the computed data digest is consistent with the data digest of the target data in the target transaction, determine that the verification on the target data succeeds.

Optionally, the third-party storage system includes a centralized content addressable storage CAS system or a distributed CAS system.

Optionally, the blockchain is any member blockchain in a consortium blockchain that includes several member blockchains.

Optionally, the third-party storage system is another member blockchain that has a cross-chain data reference relationship with the blockchain in the consortium blockchain.

The present specification further provides an electronic device, including: a processor; and a memory, configured to store a machine executable instruction, wherein by reading and executing a machine executable instruction that is stored in the memory and that corresponds to control logic of blockchain-based smart contract invocation, the processor is configured to: receive a target transaction used to initiate invocation of a smart contract, where the target transaction includes invocation data, and at least a part of the invocation data includes a data digest of target data stored in a third-party storage system interconnected with a blockchain; query the target data corresponding to the data digest from the third-party storage system, and perform content verification on the target data; and if the verification on the target data succeeds, invoke the smart contract to perform smart contract computation on the invocation data in the target transaction, and store a computation result in a distributed database of the blockchain after the smart contract computation is completed.

According to the previous implementations, the transaction used to initiate the invocation of the smart contract includes the data digest of the target data stored in the third-party storage system, so that a node device that receives the transaction in the blockchain can query the corresponding target data from the third-party storage system based on the data digest, perform content verification on the target data, after the verification on the target data succeeds, invoke the smart contract to perform the smart contract computation on the invocation data in the transaction, and store the computation result in the distributed database of the blockchain after the smart contract computation is completed. As such, the target data stored in the third-party storage system interconnected with the blockchain can be referenced as the invocation data in the transaction used to initiate the invocation of the smart contract, to alleviate blockchain data storage redundancy that is caused by synchronizing original content of the target data stored in the third-party storage system to each node device in the blockchain.

DESCRIPTION OF IMPLEMENTATIONS

In a conventional smart contract invocation process of a blockchain, invocation data (namely, invocation parameters that are input into a smart contract) required for invoking a smart contract usually comes from data content stored in a distributed database (namely, a blockchain ledger) of the blockchain, and data content stored in an external memory cannot be referenced. Therefore, invocation data used for smart contract computation when each node device in a blockchain network invokes a smart contract usually comes from a chain, thereby forming a "closed data use loop".

However, the present specification aims to disclose a technical solution in which unchangeable data content stored on a third-party storage platform is referenced as transaction content when a smart contract is invoked, to break a "closed data use loop" of a blockchain.

During implementation, the blockchain can be interconnected with a third-party storage system in advance, and the third-party storage system can pre-store several pieces of unchangeable data content that can be referenced in the smart contract deployed in the blockchain.

When initiating invocation of the smart contract, a member user who accesses the blockchain can add a data digest of the data content stored in the third-party storage system to a transaction used to initiate the invocation of the smart contract, to reference the data content stored in the third-party storage system as invocation data.

When receiving the transaction published by the member user, a node device in the blockchain can initiate a query to the third-party storage system based on the data digest to query the data content corresponding to the data digest, and perform content verification on the identified data content. When the content verification succeeds, the node device can invoke a smart contract to declare a smart contract program declared in the smart contract, and perform smart contract computation on complete invocation data in the transaction, and store a computation result in a distributed database of the blockchain after the smart contract computation is completed.

In the previous implementation, the transaction used to initiate the invocation of the smart contract includes the data digest of the target data stored in the third-party storage system, so that the node device that receives the transaction in the blockchain can query the corresponding target data from the third-party storage system based on the data digest, perform content verification on the target data, after the verification on the target data succeeds, invoke the smart contract to perform the smart contract computation on the invocation data in the transaction, and store the computation result in the distributed database of the blockchain after the smart contract computation is completed. As such, the target data stored in the third-party storage system interconnected with the blockchain can be referenced as the invocation data in the transaction used to initiate the invocation of the smart contract, to alleviate blockchain data storage redundancy that is caused by synchronizing original content of the target data stored in the third-party storage system to each node device in the blockchain.

The following describes the present specification by using implementations with reference to application scenarios.

Figure 1:
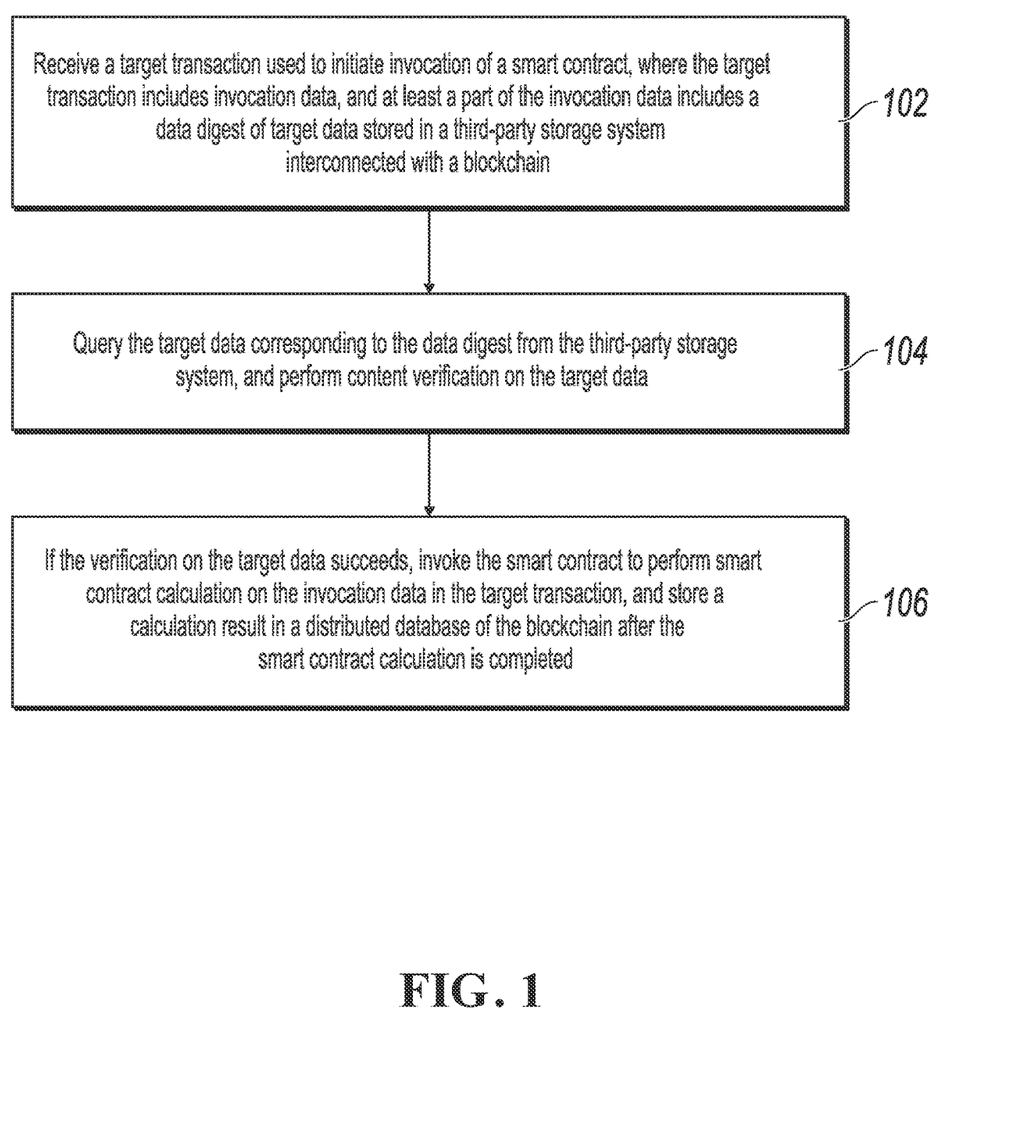
FIG. 1 is a flowchart illustrating a blockchain-based smart contract invocation method, according to an example implementation.

Referring to FIG. 1, FIG. 1 shows a blockchain-based smart contract invocation method, according to an implementation of the present specification. The method is applied to a node device in a blockchain, and includes the following steps.

Step 102: Receive a target transaction used to initiate invocation of a smart contract, where the target transaction includes invocation data, and at least a part of the invocation data includes a data digest of target data stored in a third-party storage system interconnected with a blockchain.

Step 104: Query the target data corresponding to the data digest from the third-party storage system, and perform content verification on the target data.

Step 106: If the verification on the target data succeeds, invoke the smart contract to perform smart contract computation on the invocation data in the target transaction, and store a computation result in a distributed database of the blockchain after the smart contract computation is completed.

The blockchain described in the present specification can include any type of blockchain network in which unchangeable data content stored in the third-party storage system interconnected with the blockchain can be referenced as invocation data by a supported smart contract.

For example, in a scenario, the blockchain can be any member blockchain in a consortium blockchain that includes several member blockchains. In the consortium blockchain, data content stored in another member blockchain can be referenced across chains as invocation data by each smart contract supported by each member blockchain.

The third-party storage system includes a content addressable storage (CAS) platform that provides a reliable data storage service for the blockchain. Content addressability means that addressing is performed based on data content instead of a data storage offset in the storage system.

On the CAS platform, a data digest of stored data content can be used as a query index of original data content, and a mapping relationship between the query index and the original data content is stored, so that a data query party can query the corresponding original data content from the CAS platform by using the data digest as the query index.

For example, in an implementation, the data digest can be a hash value obtained by performing hash computation on the data content. The data query party can use the hash value as a query index, to query original data content corresponding to the hash value from the CAS platform.

In actual applications, the third-party storage system can include a conventional centralized content addressable storage (CAS) system, or can include a decentralized distributed CAS system.

For example, in a scenario, the blockchain can be any member blockchain in a consortium blockchain that includes several member blockchains. In addition, the third-party storage system can be a distributed system that is deployed in the consortium blockchain and that can be interconnected with each member blockchain in the consortium blockchain, such as an object storage service (OSS) architecture.

Alternatively, in another example, another member blockchain that has a cross-chain data reference relationship with the blockchain in the consortium blockchain can be used as the third-party storage system interconnected with the blockchain, to implement cross-chain data reference between member blockchains. In other words, the third-party storage system can be another blockchain that has a cross-chain reference relationship with the blockchain. The technical solutions of the present specification are described in detail below by using an example in which the blockchain is a member blockchain in a consortium blockchain that includes several member blockchains, with reference to "deployment of the third-party storage system", "reference of the invocation data", and "invocation and execution of the smart contract".

(1) Deployment of the Third-Party Storage System

In the present specification, an operator can pre-establish a consortium blockchain including several member blockchains. In the consortium blockchain, each member blockchain is a consortium member of the consortium blockchain. The previous blockchain can be any member blockchain in the consortium blockchain.

The operator of the consortium blockchain can further deploy a third-party storage system in the consortium blockchain. The third-party storage system is interconnected with each member blockchain in the consortium blockchain, and provides a reliable data storage service for each member blockchain.

For example, the third-party storage system can provide a constantly reliable API access interface for each member blockchain, so that each member blockchain in the consortium blockchain can be interconnected with the third-party storage system by accessing the API access interface.

During third-party storage system deployment in the consortium blockchain, a global third-party storage system can be deployed for the consortium blockchain, or an independent third-party storage system can be deployed for each member blockchain in the consortium blockchain. Implementations are not limited in the present specification.

In the present specification, the third-party storage system can be a CAS system that supports content addressability. In actual applications, the third-party storage system can be a conventional centralized CAS system or can be a distributed CAS system.

The distributed CAS system can include a conventional centralized distributed system and a decentralized distributed system.

In an illustrated implementation, the third-party storage system can be an OSS architecture-based centralized distributed system and so on that are deployed in the consortium blockchain and that can be interconnected with each member blockchain in the consortium blockchain.

In another illustrated implementation, the third-party storage system can be a decentralized distributed system. During implementation, another member blockchain in the consortium blockchain that has a cross-chain data reference relationship with the blockchain can be used as the third-party storage system interconnected with the blockchain. In other words, any member blockchain in the consortium blockchain can be used as a third-party storage system interconnected with another member blockchain, to implement cross-chain data reference.

For example, in a scenario, an operator can establish a consortium blockchain based on an actual service requirement, and assign different service roles to member blockchains in the consortium blockchain. To be specific, the consortium blockchain corresponds to a complete service process, and each member blockchain can correspond to one subprocess of the complete service process.

A consortium blockchain that is established by the operator based on a service requirement "online house rental transaction" is used as an example, and each member blockchain that forms the consortium blockchain can include a "transaction chain", an "authentication chain", and a "data chain". The "transaction chain", the "authentication chain", and the "data chain" can separately correspond to one subprocess of a service process of "online house rental transaction". For example, the "data chain" is used to maintain real-name data of a house rental user; the "authentication chain" is used to complete user-specific house rental real-name authentication; and the "transaction chain" is used to complete online house rental transactions.

Then, the operator can establish the consortium blockchain as a topology diagram of a Directed Acyclic Graph (DAG) topology at a service level based on a unidirectional cross-chain data reference relationship between member blockchains.

It is worthwhile to note that the unidirectional cross-chain data reference relationship between member blockchains usually depends on an actual service requirement, and is not limited in the present specification.

Figure 2:
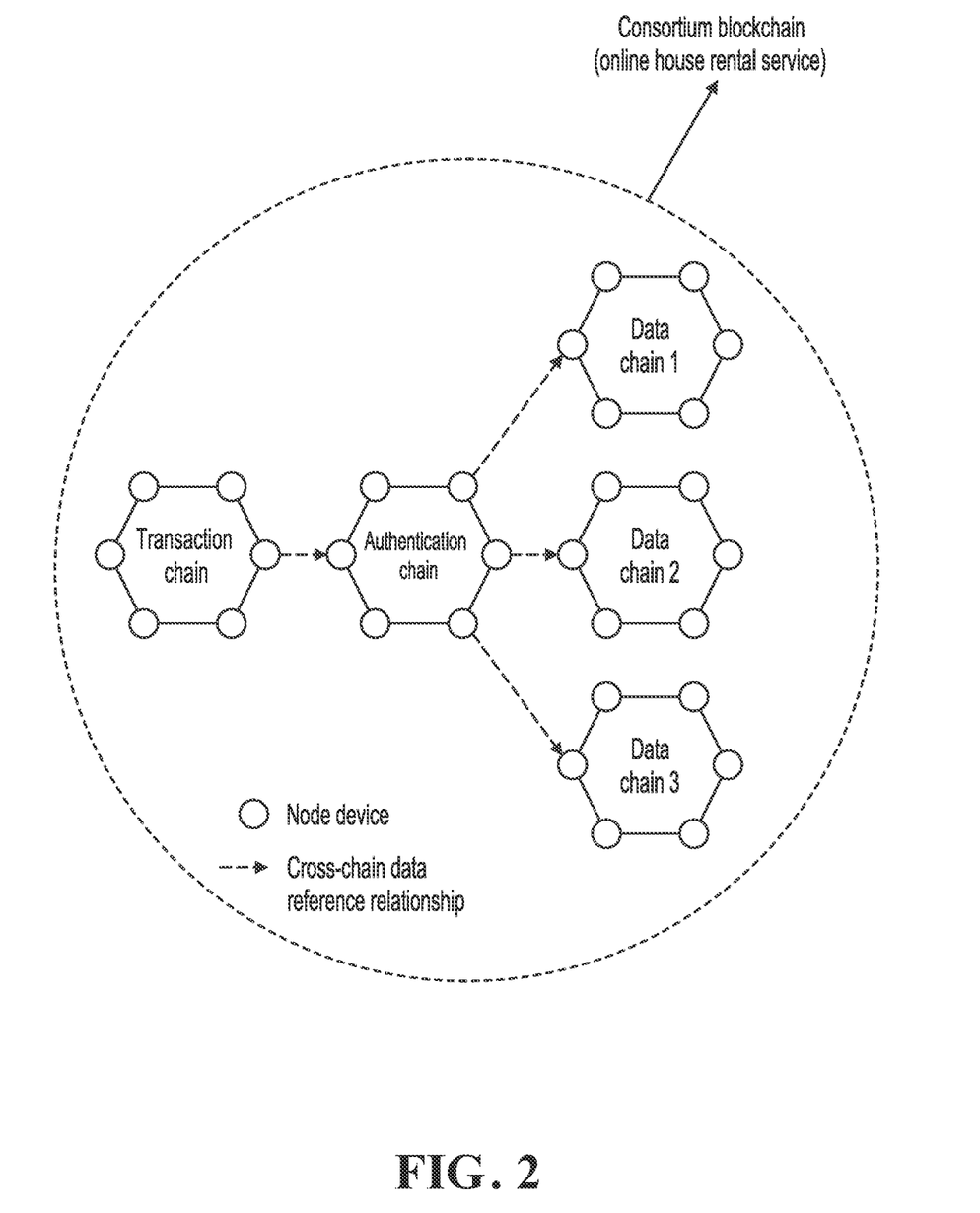
FIG. 2 is a schematic structural diagram illustrating a consortium blockchain, according to an example implementation.

For example, referring to FIG. 2, FIG. 2 is a schematic diagram illustrating a consortium blockchain of a DAG structure shown in an example.

As shown in FIG. 2, the consortium blockchain that is established by the operator based on the service requirement "online house rental transaction" is still used as an example, and member blockchains that form the consortium blockchain each can include a "transaction chain", an "authentication chain", and a "data chain". The "data chain" is used to maintain real-name data of a house rental user, and the user can store the real-name data in a distributed database of the "data chain" by publishing a transaction in the "data chain". The "authentication chain" is used to reference the real-name data of the user published in the "data chain", to complete user-specific house rental real-name authentication, and the user can complete the real-name authentication by publishing a transaction in the "authentication chain", and publish a real-name authentication result in a distributed database of the "authentication chain. The "transaction chain" is used to reference the user-specific real-name authentication result published in the "authentication chain", so that the user can complete an online house rental transaction by publishing a transaction in the "transaction chain", and publish a transaction result in a distributed database of the "authentication chain".

Another member blockchain that has a cross-chain data reference relationship with any target member blockchain in the consortium blockchain is used as a distributed storage platform interconnected with the target member blockchain.

Cross-chain data reference between member blockchains can be implemented at the service level.

In addition, when a member blockchain used as a third-party storage system invokes and executes a deployed smart contract, if target data stored in the third-party storage system is referenced in invocation data used for smart contract computation, original content of the referenced target data no longer needs to be synchronized to each node device in the target member blockchain, and the target member blockchain no longer needs to store the original content of the referenced target data.

Therefore, the target member blockchain no longer needs to set up an additional data association between the original content, of the target data, stored in the target member blockchain and the referenced target data synchronized from the member blockchain used as the third-party storage system, and can implement data association between referenced target data in two different blockchains only by using a data digest of the referenced target data, thereby ensuring that target data referenced in the smart contract deployed in the target member blockchain is consistent in terms of service semantics with the referenced target data stored in the member blockchain used as the third-party storage system.

(2) Reference of the Invocation Data

In the present specification, a user who needs to access a consortium blockchain can perform user registration in the consortium blockchain in advance, to obtain a pair of public key and private key returned by the consortium blockchain. After the registration is completed, the consortium blockchain can create a corresponding account object for the user.

A user who completes registration can access each member blockchain by using an API interface provided by each member blockchain in the consortium blockchain, and publish a transaction signed based on the held private key to each member blockchain, to invoke a smart contract deployed in each member blockchain.

The "transaction chain" in the consortium blockchain shown in FIG. 2 is used as an example. The operator of the consortium blockchain can publish, in the "transaction chain", a smart contract used to complete online house rental accounting, and the user can publish a transaction in the "transaction chain", to trigger invocation of the smart contract, and complete online house rental transaction accounting.

A detailed process in which the operator of the consortium blockchain deploys the smart contract in the consortium blockchain is omitted for simplicity in the present specification. A person skilled in the art can refer to related technical records when practicing the technical solutions described in the present specification.

For example, a plurality of members that access the consortium blockchain can jointly negotiate a smart contract, declare a developed smart contract program (for example, program code related to some functions that can be invoked) in the smart contract, and then publish the smart contract in the consortium blockchain, so that a node device in the consortium blockchain performs consensus processing, and after a consensus is achieved, record and store the smart contract in a distributed database of the consortium blockchain, to complete deployment of the smart contract.

In the present specification, the operator of the consortium blockchain can develop client software (for example, an APP) for a member user who accesses the consortium blockchain, and the member user can assemble, by using the client software, transaction data based on a standard transaction format supported by the consortium blockchain, and publish, by invoking an API interface provided by each member blockchain, the assembled transaction data to a target member blockchain in the consortium blockchain specified by the member user, to initiate invocation of the smart contract deployed in the target member blockchain.

The transaction data assembled by the member user by using the client software can include invocation data provided by the member user, and the invocation data is used as an invocation parameter that is input into the smart contract. At least a part of the invocation data can be replaced by a data digest.

In an illustrated implementation, when the member user assembles, by using the client software, transaction data that needs to be executed in the target member blockchain, the member user can fill in, by using the client software, the invocation data that needs to be included in the transaction. The client software can parse the invocation data filled in by the member user, to determine whether data stored in a third-party storage system that is interconnected with the target member blockchain exists in the invocation data filled in by the member user, in other words, to determine whether the data stored in the third-party storage system is referenced in the invocation data filled in by the member user.

If the data stored in the third-party storage system exists in the invocation data filled in by the member user, a data digest (namely, a query index) corresponding to the invocation data can be queried from the third-party storage system, or a data digest can be recomputed for the transaction content based on a data digest algorithm the same as a data digest algorithm supported by the third-party storage system, and then the data digest can be filled into a standard transaction format.

For example, during implementation, a data digest field used to include invocation data can be extended in the standard transaction format supported by the consortium blockchain. When assembling the transaction data in the standard transaction format, the client software can fill all data digests of referenced data stored in the third-party storage system into the data digest field.

(3) Invocation and Execution of the Smart Contract

In the present specification, after receiving the transaction published by the member user based on the private key, the node device in the target member blockchain can first perform identity authentication of the user based on the public key corresponding to the private key held by the user.

For example, in actual applications, the user can sign the initiated transaction based on the held private key, and the node device in the blockchain can authenticate a signature based on the public key corresponding to the private key held by the user. The identity authentication of the user succeeds if the authentication on the signature succeeds.

After the identity authentication succeeds, the node device can initiate consensus processing on the transaction in the target member blockchain, and after a consensus is achieved, record and store the transaction in a distributed database of the target member blockchain. Once the transaction is successfully recorded and stored in the distributed database of the target member blockchain, invocation of the smart contract can be triggered subsequently based on the transaction recorded in the distributed database, to execute the smart contract program declared in the smart contract.

For example, during implementation, a strict triggering execution condition is usually predetermined for the smart contract program in the smart contract. The smart contract can periodically check whether the transaction currently recorded in the distributed database satisfies the execution condition, add, to a transaction queue to be verified, a transaction that satisfies the execution condition and that is stored in the distributed database, and perform consensus processing on a transaction in the transaction queue. Execution of the smart contract program declared in the smart contract can be triggered if a consensus is achieved.

It is worthwhile to note that, a consensus algorithm used when consensus processing is performed on a transaction in the target member blockchain is not limited in the present specification. Consensus algorithms supported by member blockchains can be the same or can be different. For example, the consortium blockchain can use a mainstream consensus algorithm such as PBFT, or the consortium blockchain can independently develop a consensus algorithm.

In the present specification, when invocation of the smart contract is triggered based on the transaction to execute the smart contract program declared in the smart contract, the smart contract can first parse invocation data included in the transaction, to determine whether there is a data digest in the invocation data included in the transaction.

For example, the node device can determine, through parsing, whether the data digest field that is extended from the standard transaction format and that is used to include the transaction content is a null value, to determine whether there is a data digest in the transaction content included in the transaction.

If there is a data digest in the invocation data included in the transaction, the data content stored in the third-party storage system is referenced in some invocation data in the transaction. In such a case, to obtain complete invocation data included in the transaction, the smart contract can query target data corresponding to the data digest from the third-party storage system interconnected with the target member blockchain.

During implementation, the smart contract can establish a query request, add the data digest to the query request by using the data digest as a query index, and then submit the query request to the third-party storage system. After receiving the query request, the third-party storage system can read the query index from the query request, and then traverse, based on the query index, mapping relationships between locally stored data content and a data digest, to query target data corresponding to the query index, and return the identified target data to the smart contract.

It is worthwhile to note that the third-party storage system can be another member blockchain that has a cross-chain reference relationship with the target member blockchain. Therefore, the query request established by the smart contract can be broadcast to node devices in the another member blockchain used as the third-party storage system.

In actual applications, because of a difference between consensus algorithms used in the another member blockchain, different query results can be obtained after the smart contract sends the query request to the node devices in the another member blockchain.

For example, consensus algorithms used in a blockchain can be usually classified into two types based on distributed consistency. The distributed consistency means that data stored on all node devices in the blockchain is completely the same after a consensus is achieved by using a consensus algorithm.

A first type of consensus algorithm is a consensus algorithm that can ensure distributed consistency of each node device. For example, a fault tolerance mechanism is used to achieve a consensus in a PBFT consensus algorithm, so that data stored by each node device after the consensus is achieved is exactly the same.

A second type of consensus algorithm is a consensus algorithm that cannot ensure distributed consistency of each node device. For example, a contention-based ledger mechanism is used to reach a consensus in a PoS or PoW consensus algorithm. Consequently, it cannot be ensured that data stored by each node device after the consensus is achieved is the same. The PoW consensus algorithm is used as an example. A node device that obtains ledger permission through workload computation can store only data of a block proposed by the node device, and consequently, block data locally stored by node devices can be different.

Therefore, once a consensus algorithm used by the another member blockchain used as the third-party storage system is the second type of consensus algorithm described above, it is possible that some node devices cannot identify related data locally while other node devices can after the smart contract sends the query request to each node device in the another member blockchain.

In a scenario, if a consensus algorithm used by the another member blockchain used as the third-party storage system is the first type of consensus algorithm described above, the smart contract can perform, by using query client software that also supports the consensus algorithm, a data query to the other member blockchain to obtain a consistency query result.

The PBFT consensus algorithm is used as an example. Assume that the number of node devices in the another member blockchain used as the third-party storage system is 3f+1. After the smart contract separately sends the query request to the node devices in the another member blockchain by using the query client software, it can be considered that a query result is an ultimate query result if the same query result returned by f+1 node devices is received.

In a scenario, if a consensus algorithm used by the another member blockchain used as the third-party storage system is the second type of consensus algorithm described above, a stable and reliable node device needs to be specified as a query node in the another member blockchain. The smart contract can send the query request to the query node, and search data locally stored by the query node for related data.

In other words, in such a scenario, it can be considered that the data locally stored by the query node is a consistency result for a data reference party, and only the data locally stored by the query node can be referenced by the smart contract deployed in the another member blockchain.

It is worthwhile to note that, in actual applications, the query request can include some auxiliary query parameters in addition to the data digest that is used as the query index, to quickly identify the target data corresponding to the data digest.

For example, the third-party storage system interconnected with the target member blockchain is another member blockchain that has a cross-chain data reference relationship with the target member blockchain. Referenced data content and a corresponding data digest that are stored in the another member blockchain used as the third-party storage system are usually stored in a distributed database of the blockchain in a form of a block. Therefore, for ease of query, the query request can further include auxiliary query parameters such as a sequence number and a block number of the member blockchain in which the data digest is located.

In the present specification, after the smart contract identifies target data corresponding to a data digest included in a received transaction from the third-party storage system interconnected with the target member blockchain, invocation of the smart contract can be initiated, to execute the smart contract program declared in the smart contract and perform smart contract computation on complete invocation data included in the transaction.

First, the smart contract can perform content verification on the identified target data, to ensure that the identified target data is consistent with data content corresponding to the data digest included in the transaction.

During implementation, the smart contract can recompute a data digest of the identified target data, and then match the recomputed data digest and the data digest included in the received transaction, to determine whether the recomputed data digest is consistent with the data digest included in the received transaction.

If they are consistent, the content verification on the identified target data succeeds, and the transaction is a valid transaction. The smart contract can obtain complete invocation data included in the transaction, use complete invocation parameters as input parameters of the smart contract program declared in the smart contract, and input the parameters into the smart contract program for smart contract computation.

If they are inconsistent, the content verification on the identified target data fails. In such a case, the original referenced target data stored in the third-party storage system may be modified and updated due to system unreliability. Consequently, the transaction is an invalid transaction, and a process of invoking the smart contract can be directly terminated.

It is worthwhile to note that, when the smart contract recompute a data digest of the identified target data, a data structure of the target data, an encoding method for the target data, and a used digest algorithm all need to be consistent with those of the third-party storage system, to ensure that the node device and the third-party storage system can obtain the same computation result when performing data digest computation on the same target data.

In the present specification, after the complete invocation data included in the transaction is used as an input parameter and is input into the smart contract program declared in the smart contract to complete smart contract computation, execution of the transaction is completed, and a computation result (namely, an execution result of the transaction) of the smart contract computation can further be stored in the distributed database of the target member blockchain.

Information recorded in the distributed database of the blockchain usually includes a transaction log and a transaction state.

The transaction log is used to store a transaction log, includes blocks (block) that are connected in series in an order of occurrence, and is a transaction record in a distributed database. After a consensus on the transaction is achieved, the transaction can be recorded and stored in a corresponding block of the transaction log.

The transaction state is used to store a status change caused by execution of a transaction recorded in a distributed database. For example, a blockchain usually includes many small objects (such as an account object, a contract object, and an asset object). Each time a transaction is recorded in the distributed database of the blockchain, a status related to the transaction is synchronously updated after execution of the transaction is completed. An online transfer transaction submitted in a blockchain is used as an example. After the transaction is executed by invoking a related smart contract, a balance of an account object related to the current transfer is synchronously updated.

In such a case, after completing the smart contract computation on the complete invocation data included in the transaction, the smart contract can further store the computation result of the smart contract computation in the transaction state, to update a status change of a related object caused by the transaction. The online transfer transaction submitted in the blockchain is still used as an example. After completing the smart contract computation on the complete invocation data included in the transaction, the smart contract can update the balance of the account object related to the current transfer in the transaction state.

In the previous implementation, the transaction used to initiate the invocation of the smart contract includes the data digest of the target data stored in the third-party storage system, so that the node device that receives the transaction in the blockchain can query the corresponding target data from the third-party storage system based on the data digest, perform content verification on the target data. After the verification on the target data succeeds, invoke the smart contract to perform the smart contract computation on the invocation data in the transaction, and store the computation result in the distributed database of the blockchain after the smart contract computation is completed. As such, the target data stored in the third-party storage system interconnected with the blockchain can be referenced as the invocation data in the transaction used to initiate the invocation of the smart contract, to alleviate blockchain data storage redundancy that is caused by synchronizing original content of the target data stored in the third-party storage system to each node device in the blockchain.

For example, the third-party storage system interconnected with the target blockchain is another blockchain that has a cross-chain data reference relationship with the blockchain. Assume that the another blockchain includes five node devices, and the target blockchain includes 50 node devices. If referenced data content stored in the another blockchain is still synchronized to the target blockchain, the referenced data content needs to be separately synchronized to the 50 nodes in the target blockchain, resulting in a large amount of redundancy of the referenced data content in the target blockchain. However, if the target blockchain stores only a data digest of the referenced data content, the another blockchain does not need to separately synchronize the referenced data content to the 50 node devices. As such, data storage redundancy in the target blockchain can be significantly reduced.

Figure 3:
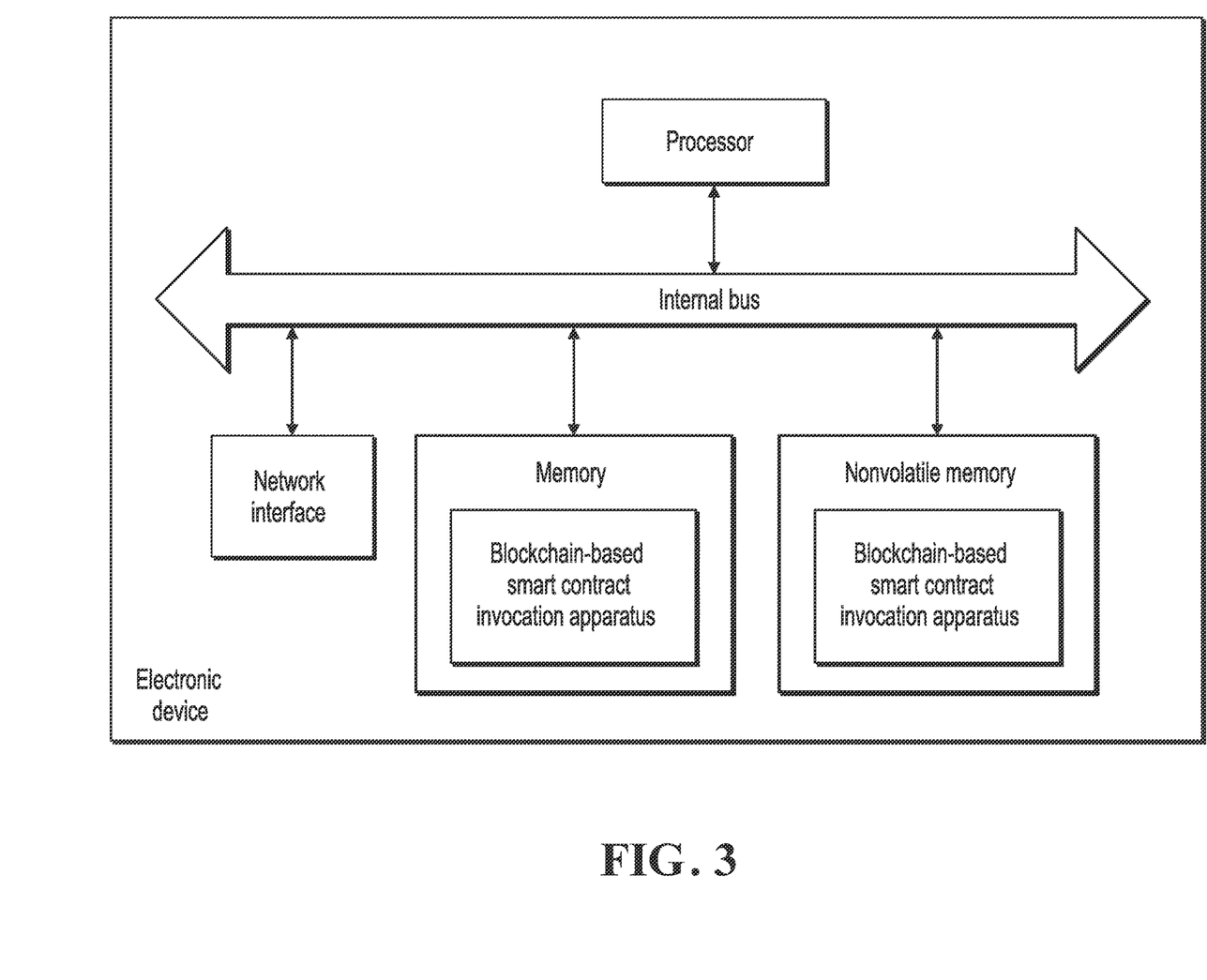
FIG. 3 is a schematic structural diagram illustrating an electronic device, according to an example implementation.

Corresponding to the method implementation, the present specification further provides an implementation of a blockchain-based smart contract invocation apparatus. In the present specification, the implementation of the blockchain-based smart contract invocation apparatus can be applied to an electronic device. The apparatus implementation can be implemented by software, hardware, or a combination of hardware and software. Software implementation is used as an example. As a logical apparatus, the apparatus is formed by reading, by a processor of an electronic device where the apparatus is located, a corresponding computer program instruction from a nonvolatile memory to a memory of the electronic device. In terms of hardware, as shown in FIG. 3, FIG. 3 is a diagram illustrating a hardware structure of an electronic device where a blockchain-based smart contract invocation apparatus is located, according to the present specification. In addition to a processor, a memory, a network interface, and a nonvolatile memory shown in FIG. 3, the electronic device where the apparatus is located in the present implementation can usually include other hardware based on an actual function of the electronic device. Details are omitted for simplicity.

Figure 4:
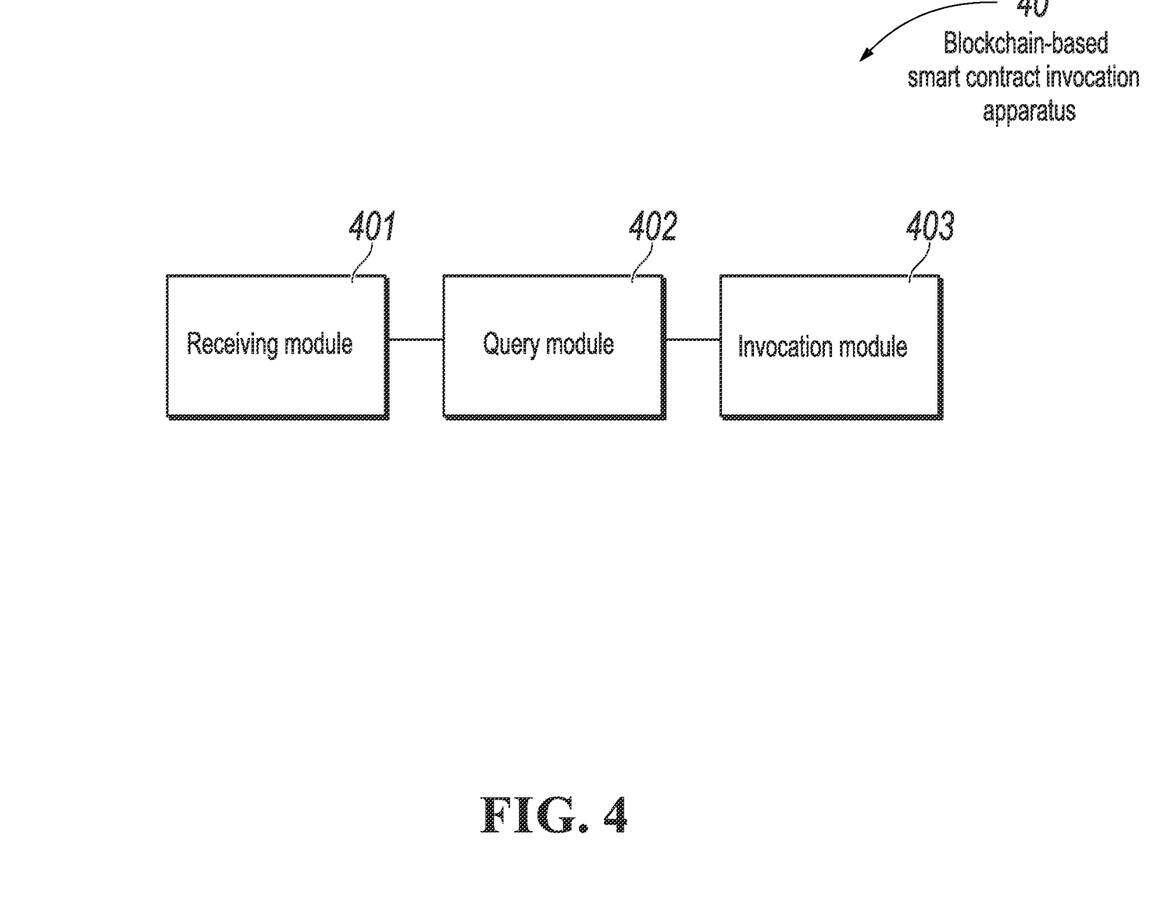
FIG. 4 is a block diagram illustrating a blockchain-based smart contract invocation apparatus, according to an example implementation.

FIG. 4 is a block diagram illustrating a blockchain-based smart contract invocation apparatus, according to an example implementation of the present specification.

Referring to FIG. 4, the blockchain-based smart contract invocation apparatus 40 can be applied to the electronic device shown in FIG. 3, and includes a receiving module 401, a query module 402, and an invocation module 403.

The receiving module 401 is configured to receive a target transaction used to initiate invocation of a smart contract, where the target transaction includes invocation data, and at least a part of the invocation data includes a data digest of target data stored in a third-party storage system interconnected with a blockchain.

The query module 402 is configured to query the target data corresponding to the data digest from the third-party storage system, and perform content verification on the target data.

The invocation module 403 is configured to: if the verification on the target data succeeds, invoke the smart contract to perform smart contract computation on the invocation data in the target transaction, and store a computation result in a distributed database of the blockchain after the smart contract computation is completed.

In the present implementation, the third-party storage system stores a mapping relationship between the target data and the data digest of the target data.

The query module 402 is configured to: initiate a query to the third-party storage system by using the data digest as a query index, to query the target data corresponding to the data digest.

In the present implementation, the query module 402 is further configured to: compute a data digest of the target data based on a predetermined digest algorithm; determine whether the computed data digest is consistent with the data digest of the target data in the target transaction; and if the computed data digest is consistent with the data digest of the target data in the target transaction, determine that the verification on the target data succeeds.

In the present implementation, the third-party storage system includes a centralized content addressable storage CAS system or a distributed CAS system.

In the present implementation, the blockchain is any member blockchain in a consortium blockchain that includes several member blockchains.

In the present implementation, the third-party storage system is another member blockchain that has a cross-chain data reference relationship with the blockchain in the consortium blockchain.

For an implementation process of functions and roles of modules in the apparatus, references can be made to an implementation process of corresponding steps in the previous method. Details are omitted here for simplicity.

Because an apparatus implementation basically corresponds to a method implementation, for related parts, references can be made to some descriptions in the method implementation. The previously described apparatus implementation is merely an example. The modules described as separate parts may or may not be physically separate, and parts displayed as modules may or may not be physical modules, can be located at one location, or can be distributed on a plurality of network modules. Some or all of the modules can be selected based on actual requirements to achieve the objectives of the solutions of the present specification. A person of ordinary skill in the art can understand and implement the implementations of the present specification without creative efforts.

The system, apparatus, or module illustrated in the previous implementations can be implemented by using a computer chip or an entity, or can be implemented by using a product having a certain function. A typical implementation device is a computer, and a form of the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Corresponding to the previous method implementation, the present specification further provides an implementation of an electronic device. The electronic device includes a processor and a memory that is configured to store a machine executable instruction. The processor and the memory are usually connected to each other by using an internal bus. In another possible implementation, the device can further include an external interface, so that the device can communicate with other devices or components.

In the present implementation, by reading and executing a machine executable instruction that is stored in the memory and that corresponds to control logic of blockchain-based smart contract invocation, the processor is configured to: receive a target transaction used to initiate invocation of a smart contract, where the target transaction includes invocation data, and at least a part of the invocation data includes a data digest of target data stored in a third-party storage system interconnected with a blockchain; query the target data corresponding to the data digest from the third-party storage system, and perform content verification on the target data; and if the verification on the target data succeeds, invoke the smart contract to perform smart contract computation on the invocation data in the target transaction, and store a computation result in a distributed database of the blockchain after the smart contract computation is completed.

In the present implementation, the third-party storage system stores a mapping relationship between the target data and the data digest of the target data.

By reading and executing the machine executable instruction that is stored in the memory and that corresponds to the control logic of the blockchain-based smart contract invocation, the processor is configured to: initiate a query to the third-party storage system by using the data digest as a query index, to query the target data corresponding to the data digest.

In the present implementation, by reading and executing the machine executable instruction that is stored in the memory and that corresponds to the control logic of the blockchain-based smart contract invocation, the processor is configured to: compute a data digest of the target data based on a predetermined digest algorithm; determine whether the computed data digest is consistent with the data digest of the target data in the target transaction; and if the computed data digest is consistent with the data digest of the target data in the target transaction, determine that the verification on the target data succeeds.

A person skilled in the present field can easily figure out another implementation of the present specification after thinking over the present specification and practicing the present disclosure here. The present specification is intended to cover any variations, uses, or adaptations of the present specification, and these variations, uses, or adaptations follow the general principles of the present specification and include common knowledge or conventional techniques that are not disclosed in the technical field of the present specification. The present specification and the implementations are merely considered as examples, and the actual scope and the spirit of the present specification are pointed out by the following claims.

It should be understood that the present specification is not limited to the precise structures that have been described above and shown in the accompanying drawings, and various modifications and changes can be made without departing from the scope of the present disclosure. The scope of the present specification is limited by the appended claims only.

The previous descriptions are merely preferred implementations of the present specification, but are not intended to limit the present specification. Any modification, equivalent replacement, or improvement made without departing from the spirit and principle of the present specification shall fall within the protection scope of the present specification.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for invocating a smart contract, comprising:
   receiving a target transaction that is used to initiate an invocation of the smart contract, wherein the target transaction comprises invocation data, wherein the invocation data comprises a data digest associated with target data, wherein the target data is stored in a third-party storage system interconnected with a first blockchain, and wherein the third-party storage system is a second blockchain that has a cross-chain data reference relationship that maps a relationship between the data digest and the target data;
   querying the target data associated with the data digest from the third-party storage system with a query request, wherein the query request comprises a block number identifying a block of the second blockchain that stores the target data;
   receiving a query result returned by the third-party storage system, wherein the query result comprises the target data;
   performing a content verification on the target data, comprising:
       computing an additional data digest associated with the target data based on a predetermined digest algorithm; and
       determining that the additional data digest is consistent with the data digest associated with the target data;
   determining that the content verification on the target data succeeds;
   in response to determining that the content verification on the target data succeeds, invoking the smart contract to perform a smart contract computation on the target data and the invocation data included in the target transaction; and
   storing a computation result from the smart contract computation in a distributed database associated with the first blockchain after the smart contract computation is completed.

2. The computer-implemented method of claim 1, wherein the first blockchain is within a consortium blockchain, and wherein the third-party storage system comprises a content addressable storage (CAS) platform that provides a data storage service for the first blockchain.

3. The computer-implemented method of claim 2, wherein the second blockchain is within the consortium blockchain.

4. The computer-implemented method of claim 1, wherein the third-party storage system stores a mapping relationship between the target data and the data digest associated with the target data.

5. The computer-implemented method of claim 4, wherein querying the target data associated with the data digest from the third-party storage system comprises:
   initiating a query to the third-party storage system by using the data digest as a query index for the target data.

6. The computer-implemented method of claim 1, wherein the third-party storage system comprises a centralized content addressable storage system, a decentralized distributed system, or a combination thereof.

7. A non-transitory, computer-readable medium storing one or more instructions executable by a computer system to perform operations comprising:
   receiving a target transaction that is used to initiate an invocation of a smart contract, wherein the target transaction comprises invocation data, wherein the invocation data comprises a data digest associated with target data, wherein the target data is stored in a third-party storage system interconnected with a first blockchain, and wherein the third-party storage system is a second blockchain that has a cross-chain data reference relationship that maps a relationship between the data digest and the target data;
   querying the target data associated with the data digest from the third-party storage system with a query request, wherein the query request comprises a block number identifying a block of the second blockchain that stores the target data;
   receiving a query result returned by the third-party storage system, wherein the query result comprises the target data;
   performing a content verification on the target data, comprising:
       computing an additional data digest associated with the target data based on a predetermined digest algorithm; and
       determining that the additional data digest is consistent with the data digest associated with the target data;
   determining that the content verification on the target data succeeds;
   in response to determining that the content verification on the target data succeeds, invoking the smart contract to perform a smart contract computation on the target data and the invocation data included in the target transaction; and storing a computation result from the smart contract computation in a distributed database associated with the first blockchain after the smart contract computation is completed.

8. The non-transitory, computer-readable medium of claim 7, wherein the first blockchain is within a consortium blockchain, and wherein the third-party storage system comprises a content addressable storage (CAS) platform that provides a data storage service for the first blockchain.

9. The non-transitory, computer-readable medium of claim 8, wherein the second blockchain is within the consortium blockchain.

10. The non-transitory, computer-readable medium of claim 7, wherein the third-party storage system stores a mapping relationship between the target data and the data digest associated with the target data.

11. The non-transitory, computer-readable medium of claim 10, wherein querying the target data associated with the data digest from the third-party storage system comprises:

initiating a query to the third-party storage system by using the data digest as a query index for the target data.

12. The non-transitory, computer-readable medium of claim 7, wherein the third-party storage system comprises a centralized content addressable storage system, a decentralized distributed system, or a combination thereof.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

receiving a target transaction that is used to initiate an invocation of a smart contract, wherein the target transaction comprises invocation data, wherein the invocation data comprises a data digest associated with target data, wherein the target data is stored in a third-party storage system interconnected with a first blockchain, and wherein the third-party storage system is a second blockchain that has a cross-chain data reference relationship that maps a relationship between the data digest and the target data;

querying the target data associated with the data digest from the third-party storage system with a query request, wherein the query request comprises a block number identifying a block of the second blockchain that stores the target data;

receiving a query result returned by the third-party storage system, wherein the query result comprises the target data;

performing a content verification on the target data, comprising:

computing an additional data digest associated with the target data based on a predetermined digest algorithm; and determining that the additional data digest is consistent with the data digest associated with the target data;

determining that the content verification on the target data succeeds;

in response to determining that the content verification on the target data succeeds, invoking the smart contract to perform a smart contract computation on the target data and the invocation data included in the target transaction; and storing a computation result from the smart contract computation in a distributed database associated with the first blockchain after the smart contract computation is completed.

14. The computer-implemented system of claim 13, wherein the first blockchain is within a consortium blockchain, and wherein the third-party storage system comprises a content addressable storage (CAS) platform that provides a data storage service for the first blockchain.

15. The computer-implemented system of claim 14, wherein the second blockchain is within the consortium blockchain.

16. The computer-implemented system of claim 13, wherein the third-party storage system stores a mapping relationship between the target data and the data digest associated with the target data.

17. The computer-implemented system of claim 16, wherein querying the target data associated with the data digest from the third-party storage system comprises:

initiating a query to the third-party storage system by using the data digest as a query index for the target data.

* * * * *